Oct. 11, 1938.  H. J. TALBOT  2,132,837
SEWAGE SLUDGE DIGESTION
Filed Feb. 8, 1936  9 Sheets-Sheet 1

FIG. I

INVENTOR.
HENRY J. TALBOT,
BY
ATTORNEY.

Oct. 11, 1938.    H. J. TALBOT    2,132,837
SEWAGE SLUDGE DIGESTION
Filed Feb. 8, 1936    9 Sheets-Sheet 2

INVENTOR.
HENRY J. TALBOT,
BY
ATTORNEY.

Oct. 11, 1938.  H. J. TALBOT  2,132,837
SEWAGE SLUDGE DIGESTION
Filed Feb. 8, 1936   9 Sheets-Sheet 3

INVENTOR
HENRY J. TALBOT,
BY Austin Middleton
ATTORNEY.

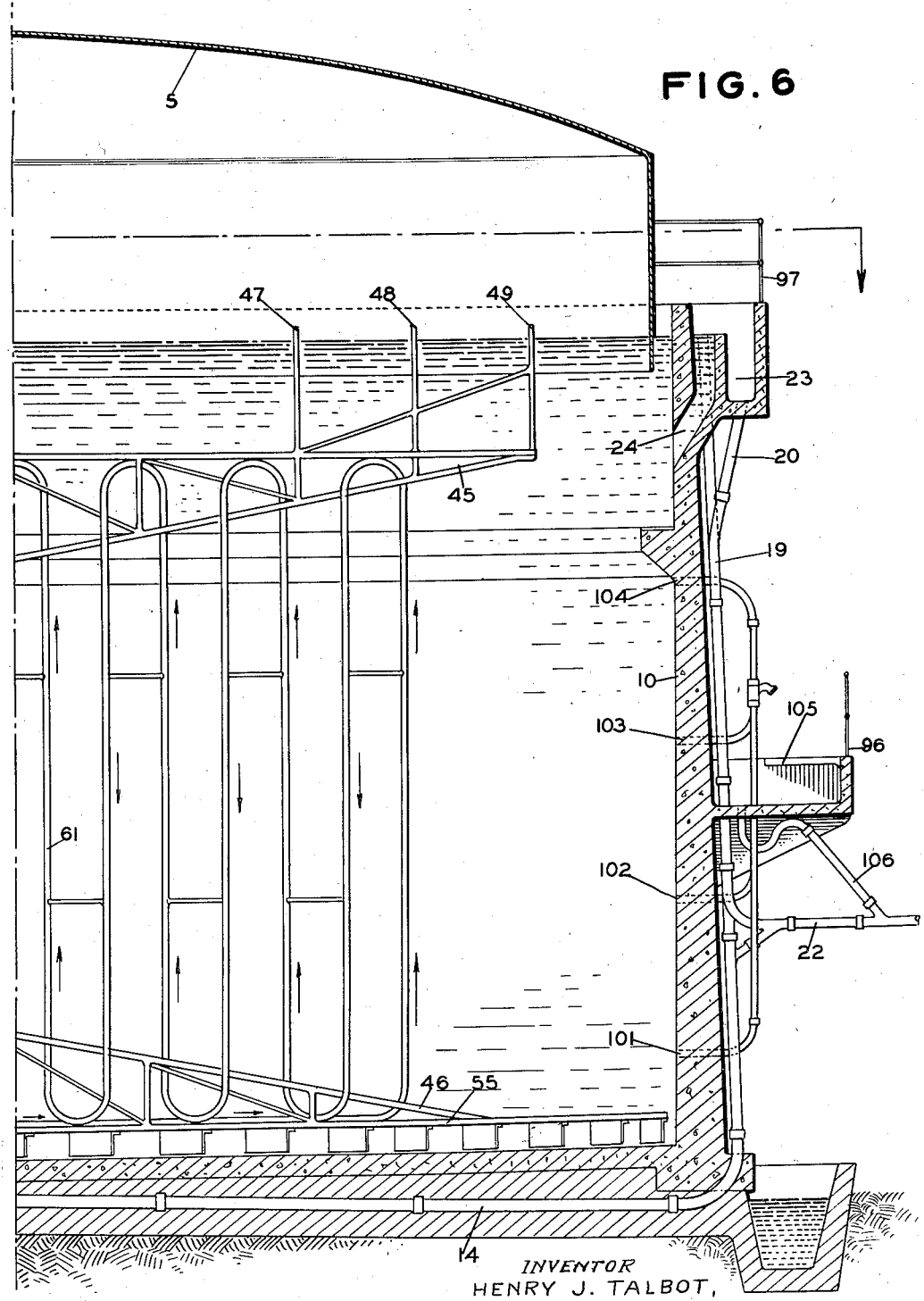

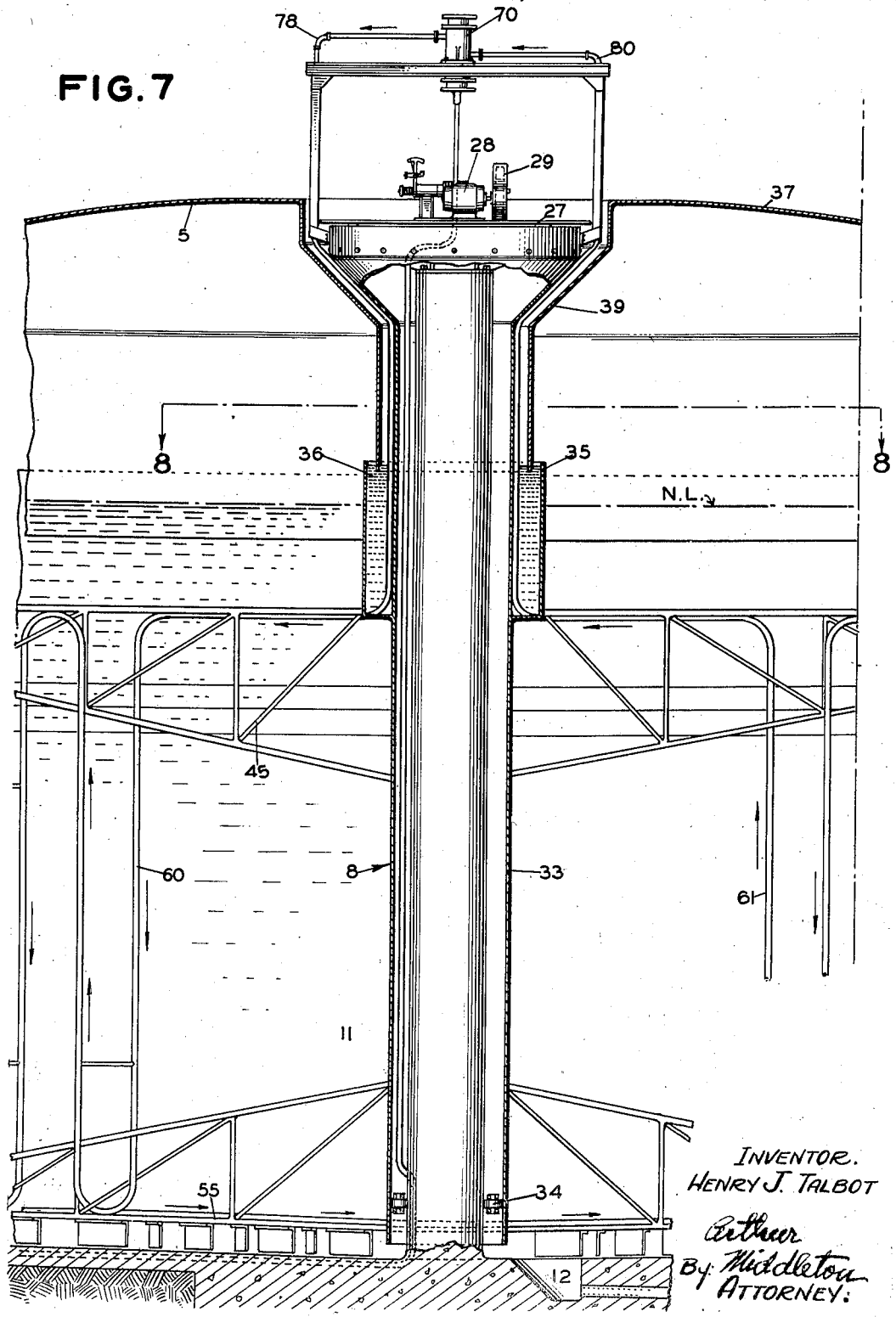

Oct. 11, 1938.　　　H. J. TALBOT　　　2,132,837
SEWAGE SLUDGE DIGESTION
Filed Feb. 8, 1936　　　9 Sheets-Sheet 6
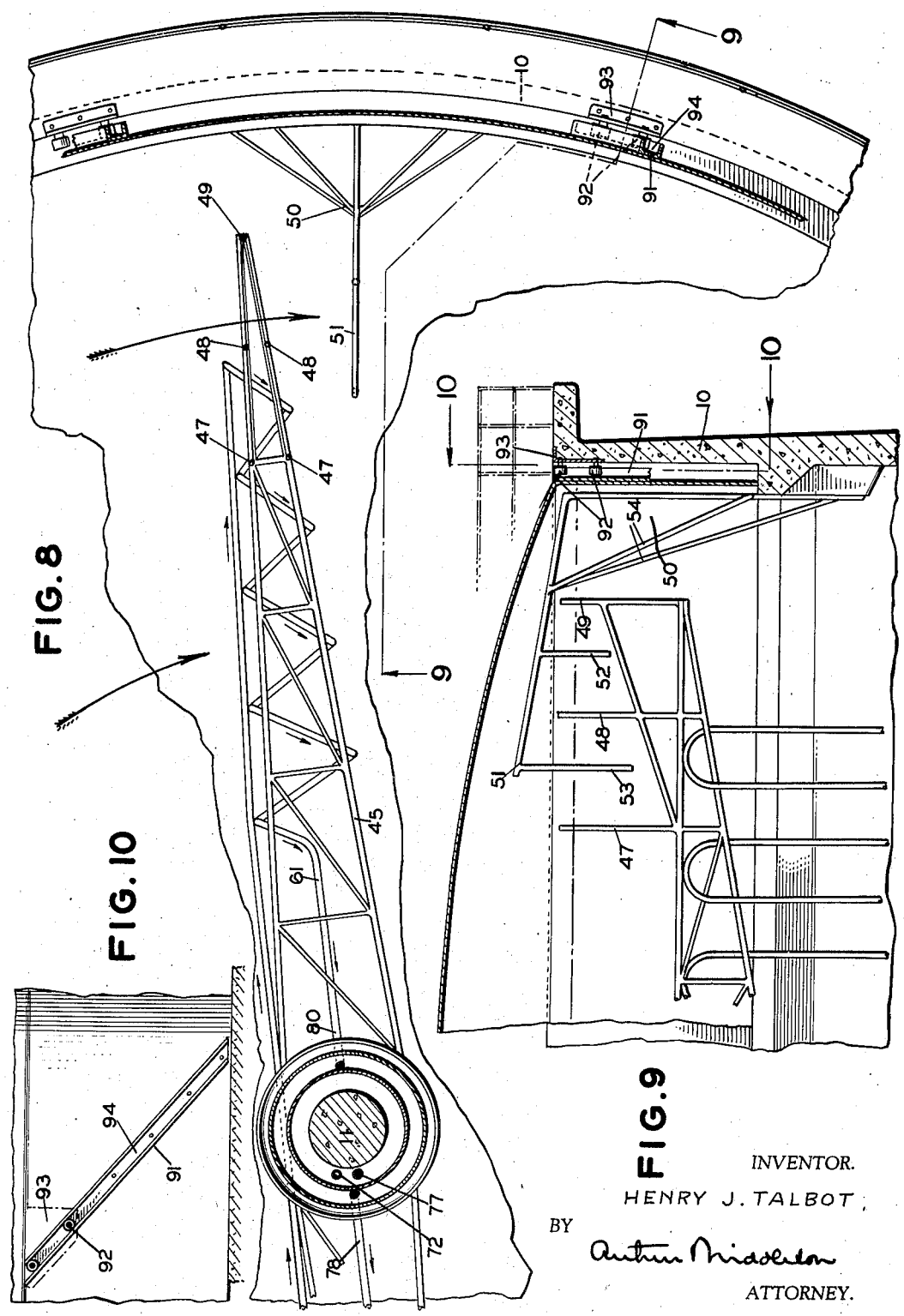
INVENTOR.
HENRY J. TALBOT,
BY Arthur Middleton
ATTORNEY.

Oct. 11, 1938.   H. J. TALBOT   2,132,837
SEWAGE SLUDGE DIGESTION
Filed Feb. 8, 1936   9 Sheets-Sheet 7

INVENTOR
HENRY J. TALBOT,
BY
ATTORNEY.

Oct. 11, 1938.   H. J. TALBOT   2,132,837
SEWAGE SLUDGE DIGESTION
Filed Feb. 8, 1936   9 Sheets-Sheet 8

INVENTOR.
HENRY J. TALBOT,
BY Austin Middleton
ATTORNEY.

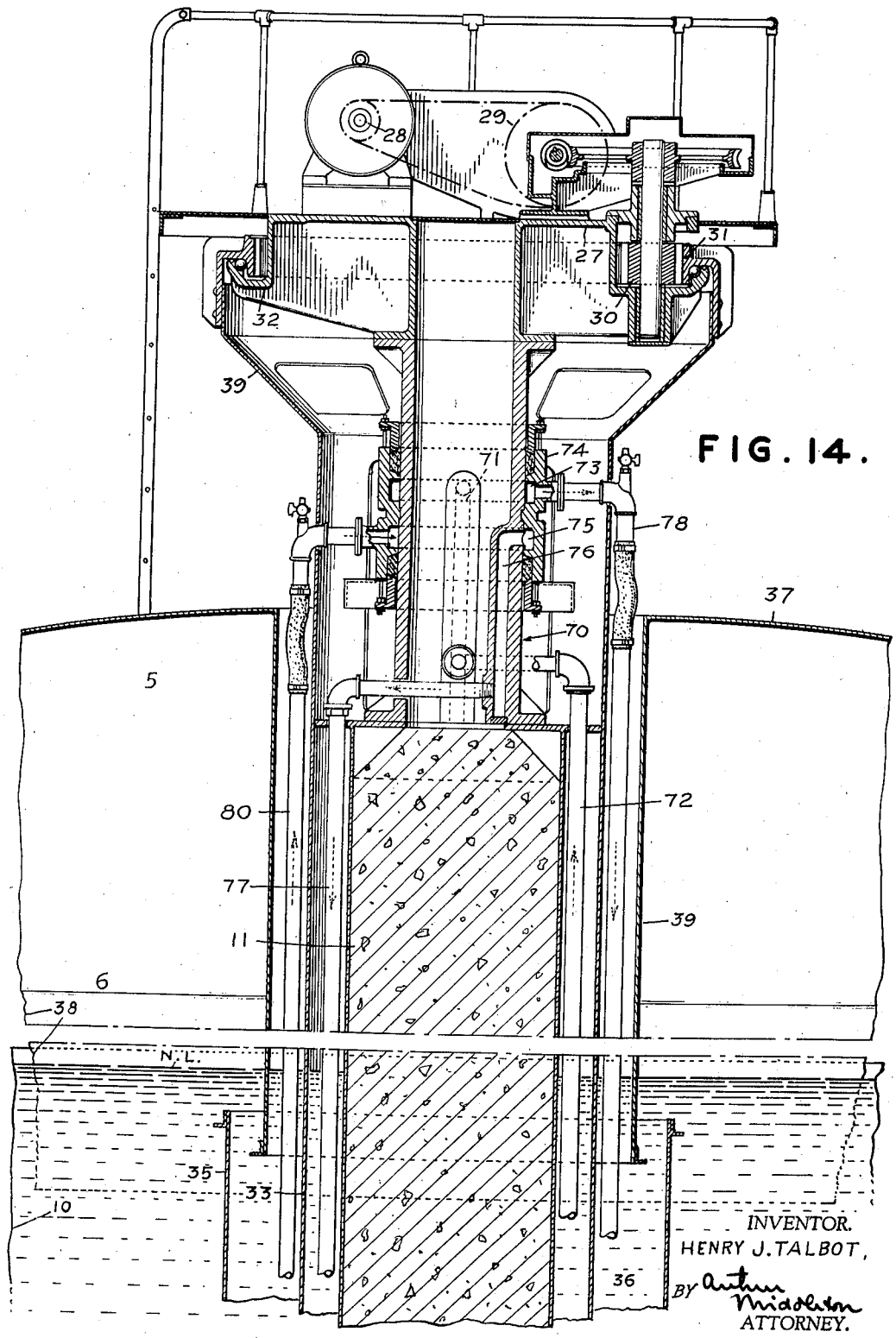

Patented Oct. 11, 1938

2,132,837

UNITED STATES PATENT OFFICE 2,132,837

SEWAGE SLUDGE DIGESTION

Henry J. Talbot, The Hague, Netherlands, assignor to The Dorr Company, Inc., New York, N. Y., a corporation of Delaware Application February 8, 1936, Serial No. 62,936
In Great Britain March 12, 1935

11 Claims. (Cl. 210—2)

This invention relates to apparatus for the separate digestion treatment of organic material, especially sewage sludge, of the kind comprising a closed container in which the material is subjected to bacterial action and provided with arrangements for collecting the gas evolved during the process.

It is known that heating the digesting sludge is an advantage particularly during cold weather and various arrangements have been employed for this purpose. One of the objects of the present invention is to provide improved and more efficient heating means particularly for digesters of very large size where uniform heating of the whole body of sludge is very difficult of accomplishment.

Another object of the invention is to provide improved means for stirring the digesting material to assist the separation of liquid and also to produce a more uniform consistency in the tank contents and to aid bacterial action.

A further object is to provide in association with the gas collecting means an improved mode of supporting the moving mechanism such as rakes, scum breakers and stirrers, located within the tank.

According to the invention heating coils or elements are mounted for rotation about a vertical axis to traverse the body of material in the digester and are preferably associated with or carried by the rake mechanism for effecting progressive displacement of the material to a discharge and/or the scum breaking devices.

According to a feature of the invention the heating coils or elements are arranged to form a series of substantially vertical bars or rods which are moved in horizontal paths and in their passage through the material are adapted to promote upward liquid currents and to thicken the sludge in the manner of the so-called picket fence thickener. In one convenient arrangement heating coils are arranged in a series of vertical loops between the discharging rake arms and the scum breaking arms of the digester. Suitable means of the rotary gland type are provided for connecting the supply and return pipes for the heating fluid to the moving system of heating coils.

According to another feature of the invention the moving mechanism within the digester which may include discharging rakes, scum breaking and stirring devices, heating elements and the like is rotatably supported from a central pedestal which may also carry the drive mechanism, and a floating gas collecting cover is provided having an annular form and surrounding the pedestal. According to a further feature of the invention the connection of the supply and return pipes for the heating fluid to the moving system of heating coils is obtained through a stationary stuffing box manifold forming part of the central pedestal, and a rotatable portion which may be supported from and rotated by the same means which support the remaining parts of the rotary mechanism.

According to a still further feature of the invention the gas collecting cover is sealed at the centre by liquid seal means carried by the rotary mechanism of the digester.

The scum breaking devices may include upwardly extending elements which cooperate with fixed devices comprising downwardly extending elements supported from the sides of the digester.

Further features of the invention will be disclosed in the detailed description which follows:

The manner of carrying out the invention will be readily understood from the accompanying drawings. One embodiment of the invention is fully illustrated in and by said drawings both in a somewhat diagrammatic manner and also in considerable detail and according to a preferred form or arrangement. The particular embodiment is used for illustrative purpose only for obviously changes and modifications can be made therein and with respect thereto without departing from the spirit of the invention as described herein and as pointed out in the appended claims.

Figs. 2 to 13 illustrate quite fully and in considerable detail a commercial embodiment of a preferred form or arrangement of the invention and of said figures just mentioned.

Fig. 2 is an exterior vertical view or exterior elevation of the digester.

Fig. 3 is a plan view—partially broken away—of the digester.

Fig. 4 is a vertical sectional view.

Fig. 5 is a horizontal sectional view taken as on the plane indicated by the line 5—5 of Fig. 4 looking in the direction of the arrows.

Figure 4:
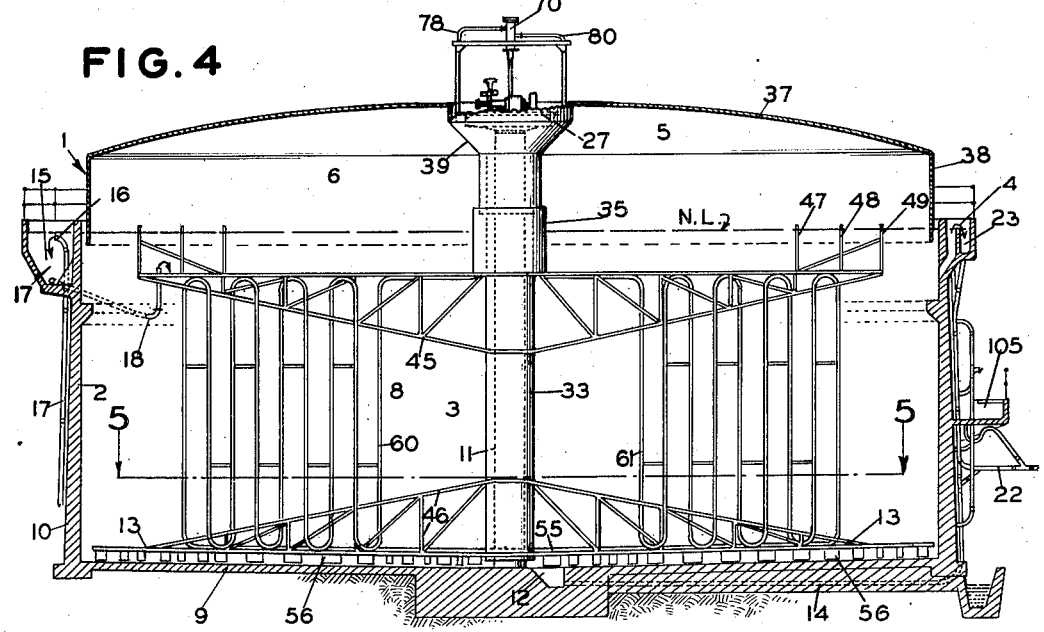
Figure 5:
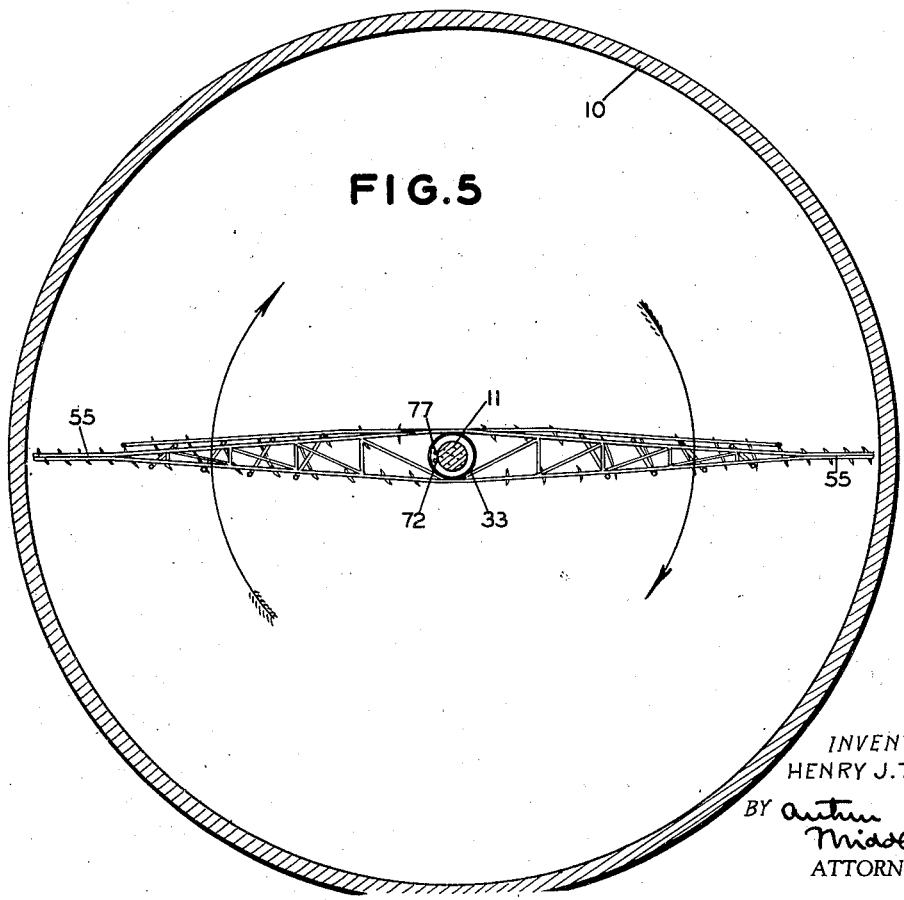

Figs. 6 and 7 collectively constitute a set of vertical sectional views at larger scale than in Fig. 4 and have been incorporated to more clearly illustrate certain details and the assemblage and arrangement of certain parts in respect to each other.

Fig. 8 is a partial plan or horizontal sectional view at the same scale as Figs. 6 and 7 and is a partial view taken as on the planes indicated by the lines 8—8 of Figs. 6 and 7.

Fig. 9 is a partial vertical section view taken as on the planes indicated by the broken line 9—9 of Fig. 8 looking in the direction of the arrows.

Fig. 10 is a partial vertical sectional view taken as on a vertically extending surface which includes the line 10—10 of Fig. 9 when looking in the direction of the arrows.

Figure 11:
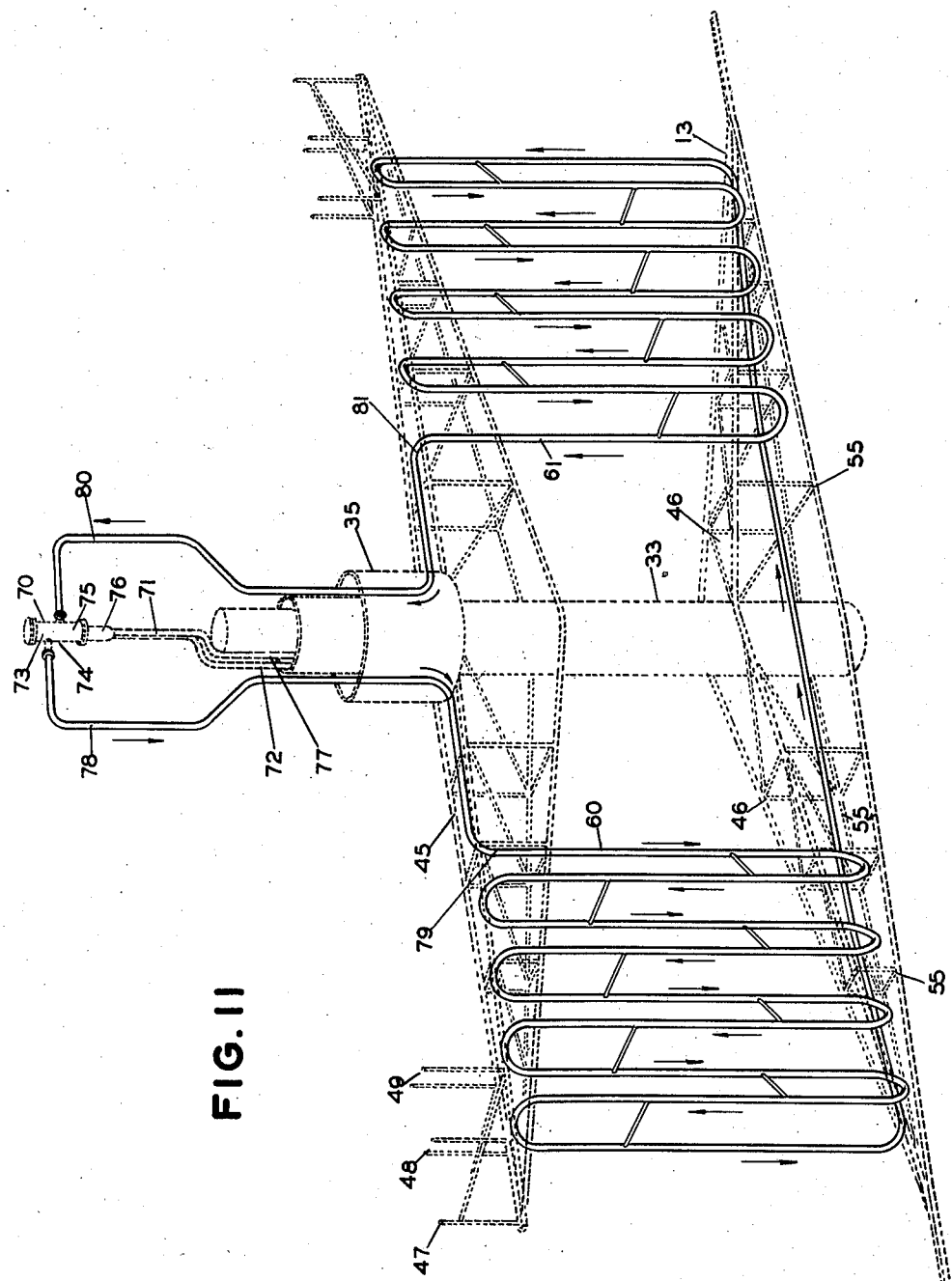

Fig. 11 is a perspective view showing in full line the heating coils employed and in dotted lines certain arms or parts by which they are carried or with which they are directly associated, and by this figure there is also indicated the mode of conducting heating fluid to the coils and of conducting the cooled or returning fluid from the coils after it has served its purpose.

Figure 12:
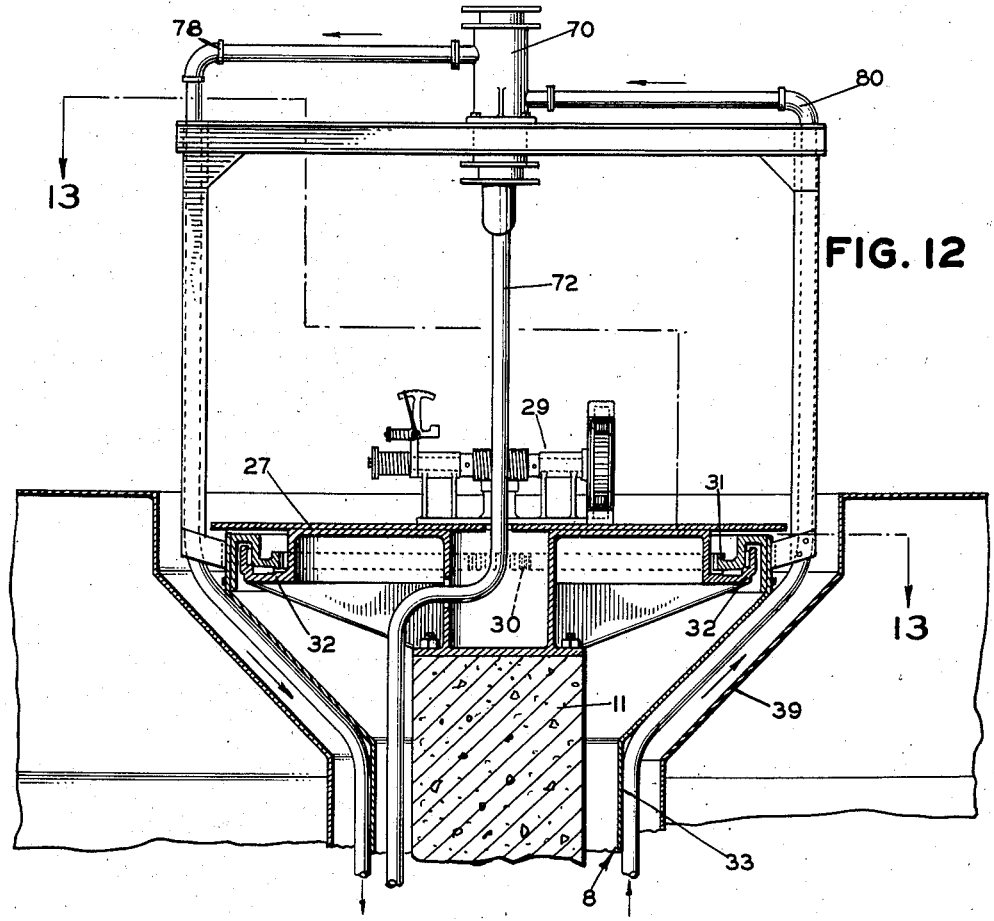
Figure 13:
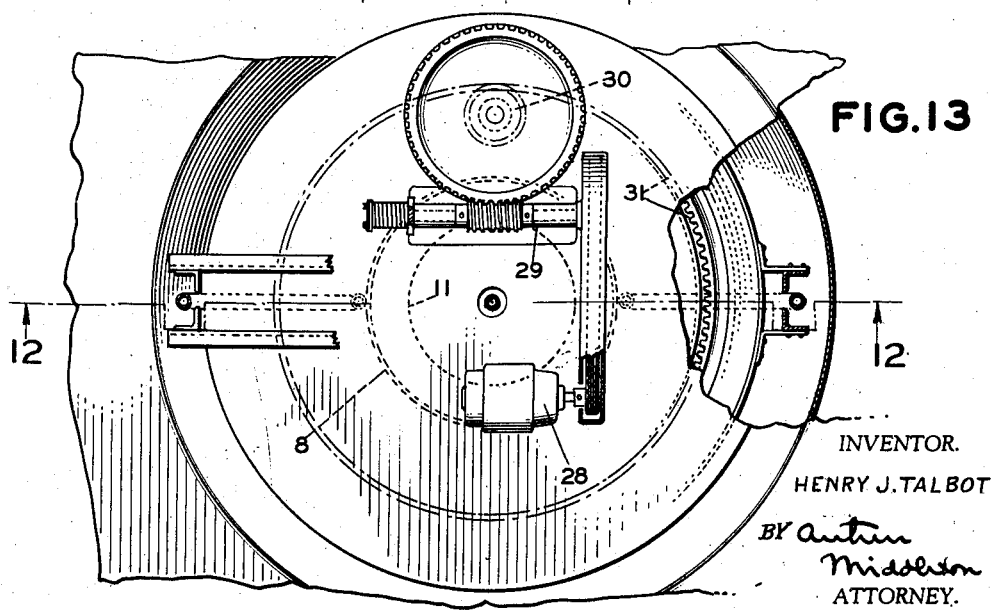

Figs. 12 and 13 are respectively a partial vertical sectional view and a partial horizontal sectional view and collectively they illustrate at a larger scale than in Figs. 6, 7, and 8 the details of certain of the operating parts located at the upper central portion of the digester, Fig. 12 being a view taken as on the vertical plane indicated by the broken line 12—12 of Fig. 13 looking in the direction of the arrows, and Fig. 13 being a view taken as on the horizontal plane indicated by the broken line 13—13 of Fig. 12 looking in the direction of the arrows.

Fig. 14 shows a modified arrangement whereby the stuffing box manifold forms part of the pedestal which supports the rotary mechanism and the rotating part of the stuffing box and the glands thereof are supported and rotated by the mechanism itself.

The accompanying drawings will now be referred to in detail and in connection therewith like reference characters indicate like or similar functioning parts throughout the several views.

The digester which is the basis of the present invention is a relatively gas-tight container collectively designated by 1. It comprises a digester tank 2, sometimes referred to as a digestion tank structure and is constructed so as to provide therein a liquid or sludge receiving and holding space 3, wherein a body of sludge is normally maintained up to a level marked N. L. as is determined by the overflow weir construction 4. This digester tank has directly associated therewith a floating dome shaped cover 5 providing therein and at the underside thereof a gas receiving and collecting space 6. Means is provided at 7 whereby incoming sludge can be readily fed to the interior of the tank and also whereby the digester will be retained relatively gas-tight regardless as to when and whether sludge is being fed to the interior of the digester.

The digester is provided with a mechanism having members turnably mounted therein for engaging the sludge or body of liquid therein, namely, horizontally rotatable members having arms 55 carrying rakes or scraper blades 56 for effecting a raking and transferring of settled sludge, some of which are for breaking any layer of scum which collects or tends to form within the upper region of the tank 2, and others of which are provided as heating coils and are for heating the sludge within the digester. The construction having or providing horizontally turnable members just referred to is collectively designated as 8 and is sometimes referred to herein as the rotatable sludge engaging mechanism.

The tank or tank structure 2 has a bottom 9, an upstanding marginal wall 10 and a stationary centrally-located pier or column 11 that extends substantially above the normal level of the body of liquid or sludge maintained within the digester tank. The digester tank 2 is also provided with a sump or discharge section 12 for receiving settled solids raked from diverse sections of the bottom of the tank and transferred thereto incident to horizontal turning movement of the arms carrying the rakes or blades. The arms 55 and the rakes or scraper blades 56 just mentioned constitute important members of what may be referred to as the sludge raking and scraping sections or devices 13.

The tank as shown is circular in cross section. The sludge raking and scraping devices 13 are mounted so as to rotate concentric with the pier or column 11 that is to say about the pier or column and as just indicated they collectively function to rake settled sludge from the diverse sections of the bottom of the tank and to impel as by a plowing action the sludge thus raked thereby towards and into the discharge sump 12. From this sump or receiving section the settled solids in the form of sludge is withdrawn in any suitable manner as through or by the sludge withdrawal pipe or means 14.

Reference has heretofore been made to the feeding means 7. This means comprises a portion or section providing a feed receiving pocket into the upper portion of which the incoming sludge is delivered at 16 from a supply pipe or conduit as 17. From the lower portion of this pocket section 15 there extends a U-shaped pipe or conduit 18 through which the incoming sewage sludge from the pocket 15 is passed preferably to and into the upper portion of the liquid holding space 3 within the digester tank 2. It will be manifest that the feed construction just described insures a relatively gas-tight arrangement and that this feed will be maintained gas-tight even though the level within the digester should, as due to some abnormal situation, fall below the upper or delivered end of the U-shaped pipe 18.

The aforementioned sludge withdrawal pipe 14 has an upwardly extending high section 19 which may be provided with a valve controlled branch 20, the delivery end of which branch is at a somewhat lower elevation than that of the uppermost end 21 of the high section. If the valve controlled branch 20 is closed there is no normal discharge of sludge through the high section 19, since the uppermost end 21 thereof is substantially above the normal level N. L. If operated with the valve controlled branch 20 closed then the prime function of the pipe 19 is to provide an available rodding opening should the pipe 14 become clogged.

Pipe 14 has a main valve controlled line or pipe 22 leading therefrom, through which sludge is withdrawn or passed from the lower interior portion of the tank as and when desired. Some operating conditions may indicate the advisability of employing a split flow from the interior of the digester tank and in order to attain this it is feasible to open the valve in branch 20 and to permit the split flow to follow, namely, by permitting a diverted passing of some of the settled sludge from the lower portion of the tank through the pipe 14 past the valve in branch 20 from which the sludge will overflow into the overflow box 23 and a simultaneous direct passing of supernatant liquid from the upper interior portion of the liquid holding space within the tank through the opening 24 and past the overflow weir at 4, into the overflow box 23. The flowable content within the overflow box 23 passes therefrom through the discharge pipe 25.

Gas from the interior of the digester is withdrawn or passed through the gas withdrawal pipe 26.

Reference has heretofore been made to the sludge engaging mechanism collectively designated by 8 and the fact that this mechanism includes the sludge raking and scraping devices 13.

The sludge engaging mechanism 8 derives its entire support from the stationary centerpier 11 and is turnable or rotatable about the same.

The pier 11 carries a stationary platform 27 upon which there is mounted a motor 28 and speed reducing and power transmission mechanism 29 that comprises a spur gear 30. This spur gear 30 therefore constitutes a driving member that meshes with an internal annular gear 31 driven thereby.

The driven annular gear 31 just mentioned is connected to or constitutes part of the turnable mechanism 8 that derives its entire support from the pier 11 and more particularly from and through the medium of a stationary annular carrying section 32, which is on or constitutes a part of the stationary platform construction 27. In the construction shown the annular gear 31 may be viewed as providing a turnably supported annular member that is carried on, and guided by the stationary annular carrying section 32. The horizontally turnable mechanism 8 has a drum or cage structure 33 that depends and is carried from the turnably supported annular member or gear 31. This drum or cage structure in the construction shown extends from the exterior of the digester downwardly within the tank for substantially the full depth thereof and is guided against tilting action in any suitable manner as through the medium of suitable guide members provided as by blocks or rollers at 34. The body portion of this member 33 and more particularly the upper portion thereof that extends downwardly into the sludge is preferably tubular in formation and it constitutes a part of a sealing cup 35 for holding a sealing liquid 36, which is preferably other than the liquid provided by the sewage undergoing digestion within the tank. The liquid holding cup 35 just referred to is annular in plan and is U shaped in cross section.

At this juncture it is in order to point out the fact that the floating cover 5 comprises a top or cap section 37 and outer and inner depending flanges 38 and 39. It is, of course, gas-tight and provides the gas receiving space 6 at the underside thereof and between the inner and outer flanges thereof. The inner flange 39 constantly dips into the sealing liquid 36 within the cup 35. The outer flange 38 extends close to the innermost portion of the upstanding marginal wall 10 of the tank and dips into the sludge within the tank. The result of the dipping of the inner flange 39 into the sealing liquid 36 and of the outer flange 38 into body of sludge undergoing digestion within the tank is a relatively gas-tight arrangement which precludes the escape of gas from the receiving section 6 downwardly along the flanges 38 and 39, thence past the lower edges of the flanges to the atmosphere.

Rotatable gear member 31 and the depending drum or cage 33 constitutes a member which derives its entire support from pier 11, which is turnably mounted so that it can be caused to turn about said pier by and because of forces applied thereto at the exterior of the digester, to wit, by forces applied by the spur gear 30 to the thus driven annular gear.

The sludge engaging mechanism 8 has upper and lower radially extending arms 45 and 46. Each of said arms is directly connected at its inner end to the depending drum or cage 33 in a manner whereby the arm is carried and driven entirely by and through the medium of the depending drum or cage 33. The arms 45 and 46 are preferably of a structural formation such as is clearly indicated in Fig. 11 with the result that they are relatively stiff and rigid.

Each upper arm 45 carries horizontally spaced vertically extending scum breaking fingers 47, 48 and 49, constituting horizontally movable scum breaking elements. From and by the marginal walls 10 of the tank there are stationary braces or frames 50. Each frame 50 provides an upper member or relatively horizontally extending chord 51 from which there downwardly extends horizontally spaced fingers or members as 52, 53 and 54, constituting stationary scum breaking elements positioned for functional association with the horizontally movable scum breaking fingers. As the vertically extending members 47, 48 and 49 move in a horizontal path they enter and pass through spaces defined by and between depending figures or members 52, 53 and 54 with the result that an efficient scum breaking mechanism is enabled to be realized.

Each lower radial arm 46 provides a member 55 by which rakes or scrapers 56 are carried and from which the rakes or scrapers depend.

Heating coils have heretofore been mentioned. Such are designated as 60 and 61. They comprise loop elements having sections which are relatively straight and which extend vertically from substantially the lower interior portion of the digester to the upper section of the liquid holding portion thereof. The lower portions of these heating coils are directly connected to and carried by the lower arms 46 and the upper portions of the heating coils are directly connected to and carried by the upper arms 45.

The heating coils 60 and 61 are connected in series, as will be clear from an inspection of Fig. 11 and they are operatively associated with a manifold construction provided at 70.

The manifold at 70 comprises a stationary tubular section 71 terminating in a hot fluid receiving section 73 provided in a turnable casing 74. Incoming heating fluid is supplied through the pipe 72 which passes therefrom upwardly into the stationary tubular section 71, thence into the hot fluid receiving section 73.

This turnable member of the manifold also has a receiving fluid return section 75 that is in constant direct communication with a stationary tubular section 76 of the manifold. This last mentioned section 76 of the manifold is in direct connection with a return pipe 77 leading from below the digester.

A connecting pipe 78 leads from the hot fluid receiving section 73 of the turnable casing 74 to the intake end 79 of the heating coils. A connecting pipe 80 leads from the delivery end 81 of the heating coils to the return fluid receiving section 75 of the turnable casing.

The pipes 78 and 80 just referred to turn as the sludge engaging mechanism 8 turns.

The hot fluid supply pipe 72 and the return fluid pipe 77 have horizontal sections below or embedded in the structure providing the tank bottom. They also have vertically extending sections essentially located within the turnable drum or cage 33. In the arrangement shown portions of these vertical pipe sections are located within the space which is within the drum or cage 33, but exterior of the pier or column 11. It would be feasible to make the pier or column 11 hollow and to carry these vertical pipe sections through the central portion of the pier.

The floating dome 5 is provided with guiding elements located at the outside of the depending outer flange. These guiding elements are designated as 91 and are collectively associated with guiding elements corresponding thereto, such as are provided by rollers 92 that are carried on brackets or supporting plates 93 which are fixedly positioned to and at the upper interior of the marginal wall 10 of the tank. The guiding elements 91 provide grooved portions 94 into which the rollers 92 extend and with which the rollers cooperate. These grooved portions are arranged so that they in fact extend along paralleling screw shaped or substantially helical paths. Each of these grooved guiding elements 91 may be otherwise defined as having a downward and forward inclination in respect to a vertical line. They are preferably symmetrically arranged about the exterior of the floating dome or dome shaped cover and are provided so as to insure a relatively level and uniform position for the dome as it rises and falls and so that the dome will not tilt incident to an abnormal load being applied to a peripheral portion thereof as for example, due to unbalancing load caused by a person entering upon and walking over the top of the dome. These inclined grooved portions have the effect of causing the dome 5 to move or turn as a guided screw element about a vertical axis as the dome as a whole either rises or falls.

The motor and most of the essential parts of the speed reducing and power transmitting are located at the exterior of the digester at or in the immediate region of the central portion of the dome. It therefore becomes necessary for an operator to have ready access to the motor speed reducing mechanism and associated parts. It is also advisable to have access to the upper periphery portions of the tank and dome. To the ends just mentioned stairways and walkways are provided at 96 and 97.

It is advisable to have access to different vertical elevations to the interior of the tank for the purpose of testing the sludge within these sections and thereby check the operations of the digester as a whole. To the end just mentioned test pipes as 101, 102, 103 and 104 are provided leading from the interior of the tank to the exterior thereof. These test pipes are provided with faucets that are immediately over a tank or sink 105. This tank or sink 105 is located in the vicinity of the stairway construction and therefore access is readily had to the test faucets.

The sink is provided with drain 106 leading to the pipe 22 heretofore referred to. The sludge drain from the sink can therefore pass through the pipe 22 either directly back into the digester tank through pipe 14 or away from the digester by continuing outwardly through the pipe 22, this according to whatever operating conditions exist at the particular time.

Figure 1:
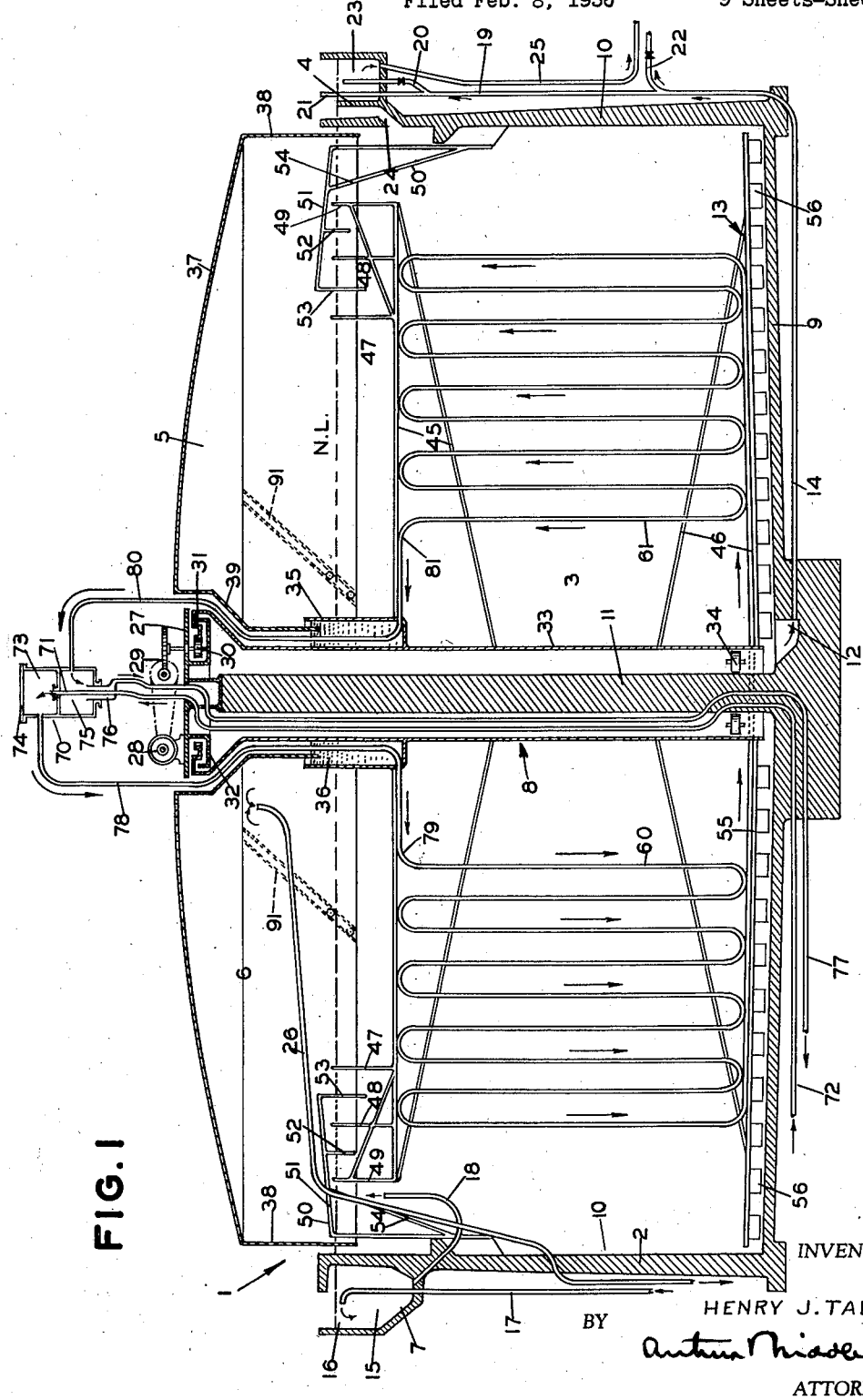
Fig. 1 is a vertical sectional view, somewhat diagrammatic, illustrating the general relationship of certain features essential to or entering into the make up of one embodiment of digester for realizing the present invention.
Figure 2:
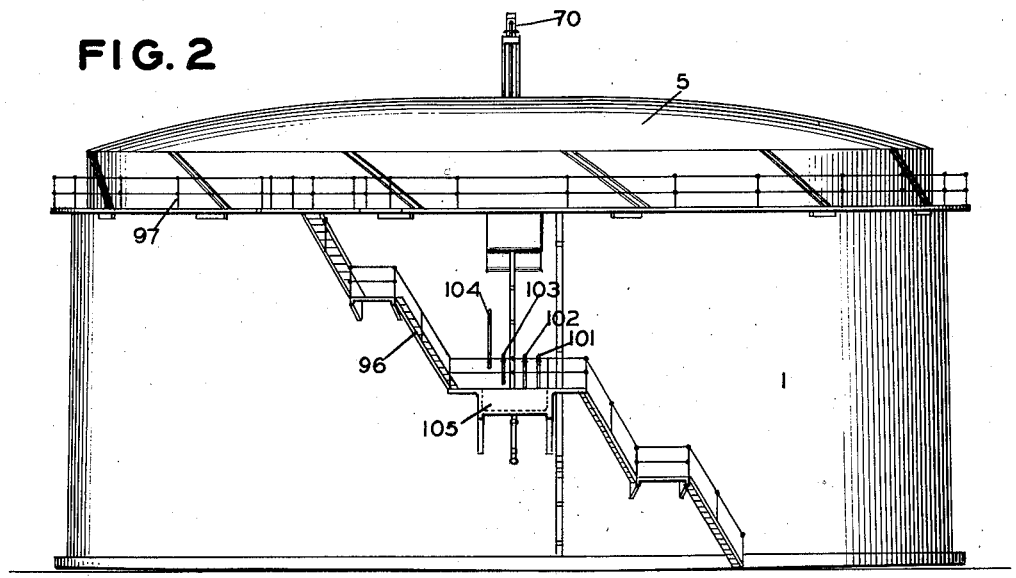
Figure 3:
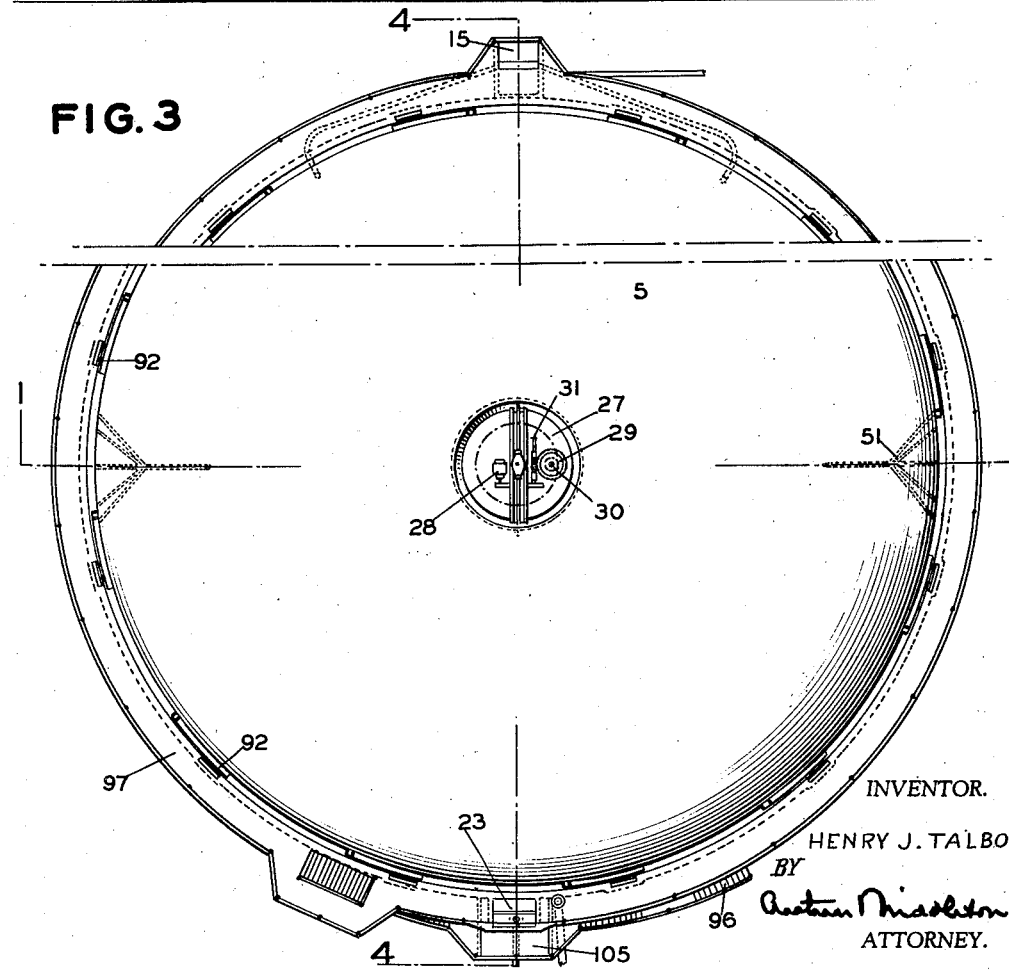

The diagrammatic Fig. 1 in general illustrates fundamental essentials of the digester as a whole and the major portion of this description is readable thereupon. The entire description is completely readable upon the more specific and detail embodiment of the invention as illustrated by Figs. 1 to 13 inclusive.

Having now particularly described and ascertained the nature of my said invention and in what manner the same is to be performed I declare that what I claim is:—

1. A sewage sludge digester having in operative association a tank, means for feeding sludge thereto, a sediment discharge leading therefrom, a liquid withdrawal means determining the normal operative level of the body of sludge in the tank; a centrally disposed upstanding stationary pier provided with a stationary bearing member, a horizontally turnable sediment raking mechanism comprising a movable bearing member mounted on said stationary bearing member, an arm-carrying structure depending from said movable bearing member, a sediment raking arm construction deriving support from said arm carrying structure; motivating means including speed reducing and power transmission elements for imparting turning movement to said mechanism; a top member for the digester having an annular cap portion with depending inner and outer marginal flanges that serve to complete a relatively gas-tight seal when dipping into sealing liquid and respectively providing with the sludge of the digester a gas-enclosing space in the tank, and means for withdrawing gas from said gas space; said arm carrying structure being characterized in that it embodies a section providing a liquid-holding cup open at the top but otherwise closed, annular in horizontal cross section, and arranged for the reception thereinto of the depending inner flange of said top member.

2. A sewage sludge digester as defined in and by claim 1 and wherein the open top of the liquid-holding cup is at an elevation lower than that of the normal operative level of the body of sludge within the tank as determined by the liquid withdrawal means whereby the liquid in the body of sludge within the digester tank essentially enters the cup and provides a gas-sealing liquid therein.

3. A sewage sludge digester as defined in and by claim 1 and according to which the open top of the liquid-holding cup is at an elevation higher than that of the normal operative level of the body of sludge within the tank as determined by the liquid withdrawal means whereby there may be employed as a gas-sealing liquid within the cup liquid of a type different from that of the sludge.

4. A sewage sludge digester wherein there is included in operative association a tank having means for feeding sludge thereto, a sludge discharge leading therefrom, a centrally-disposed upstanding pier provided with a stationary bearing member overhanging a main upstanding body portion of the pier; motivating means and power transmission means carried at the top of said pier; a turnable rake-arm carrier actuated from said motivating means through the medium of said power transmission means; a sludge rake-arm construction; and a top member essentially provided for completing a gas-receiving and collecting space at the upper portion of said tank; said turnable rake-arm carrier having a horizontally-movable bearing member mounted on said stationary bearing member, a tubular structure depending from said movable bearing member and constructed so as to provide an inwardly and downwardly tapering funnel-shaped upper portion, a cylindrical lower portion providing a section from which the rake-arm construction is carried, and a cup portion that extends outwardly and upwardly from the cylindrical lower portion whereby in conjunction with said cylindrical lower portion there results a liquid-holding cup that is closed except at the top, that is annular in horizontal cross section, and which is disposed below the aforesaid funnel-shaped upper portion; said top member having an annular cap portion with a depending inner flange encircling the pier and extending downwardly into the liquid-holding cup, which said depending inner flange of the top member includes an inwardly and downwardly tapering funnel-shaped upper portion providing a receiving space for the aforementioned stationary bearing member and a cylindrical lower portion extending downwardly from the small end of the funnel-shaped portion and providing a section that extends into the annular cup.

5. As a product of manufacture for use in a digester tank a sludge raking mechanism comprising a horizontally turnable bearing member, and arm-carrying structure depending therefrom that comprises a tubular body portion from which there extends outwardly and thence upwardly a portion which with the tubular body completes a cup that is closed except at the top and that is annular in horizontal cross section, and an arm construction providing settled solids raking elements and carried by and extending from that portion of the tubular body which is below the cup.

6. A horizontally turnable sludge raking mechanism comprising a vertically-extending arm-carrying member having means for turning the same about a vertically extending axis, a lower settled solids raking arm construction, an upper scum breaking arm construction, each of which arm constructions is carried and moved by said arm-carrying member, and tubular heating means having loops providing horizontally spaced vertically-extending heating elements, the upper and lower portions of which loops are respectively connected to said upper and lower arm constructions so as to be carried by and be movable with said arm constructions.

7. A sludge digester wherein there is included in operative association a tank having a bottom and an upstanding marginal wall, means for feeding sludge thereto, a sludge discharge leading therefrom, a liquid withdrawal means, a horizontally turnable mechanism having an arm-carrying structure suitably mounted in respect to the tank so as to turn about a vertically-extending axis, a lower arm construction providing sludge raking elements and deriving support from the arm-carrying structure, means for imparting turning movement to said sludge raking mechanism; a top member encircling the arm-carrying structure provided for completing a gas space at the upper portion of the tank, an inwardly extending stationary means carried from the marginal wall of the tank provided with horizontally spaced depending fingers constituting downwardly extending scum breaking elements; and an upper arm construction providing horizontally spaced upwardly extending fingers constituting scum breaking elements arranged for traversing the upper regions of the liquid-holding section of the tank into which extend the depending scum breaking elements, which during the horizontal movement thereof become interpositioned with respect to the stationary depending fingers.

8. A sewage sludge digester wherein there is included in operative association a tank having a bottom and an upstanding marginal wall, means for feeding sludge thereto, and a sludge discharge leading therefrom; a turnable sediment raking mechanism having an arm-carrying structure mounted in respect to the tank for rotative movement about a vertically-extending axis and raking arm construction deriving support from said arm-carrying structure; a top member encircling the upper portion of said arm-carrying structure; having an annular cap portion with depending inner and outer marginal flanges and means for imparting from the exterior of the digester the forces requisite to effect turning movement to said raking mechanism; and cooperatively associated guideway elements some of which are fixedly positioned in respect to the marginal walls of the tank and others of which are affixed to the depending outer marginal flange of the movable top member with some of said guideway elements being disposed so that they have a downward and circumferential slope whereby as the top member moves vertically there is imparted to the top member a partial turning movement about a vertically-extending axis.

9. A sewage sludge digester wherein there is included in operative association a tank having a bottom and an upstanding wall, means for feeding sludge thereto, and a sludge discharge leading therefrom; a horizontally turnable mechanism having a vertically-extending arm-carrying structure rotatively supported in respect to the tank structure so as to permit horizontal turning movement about a vertically-extending axis, and a sludge engaging arm construction deriving support from the arm-carrying structure; sludge heating tubular elements movable with the arm construction; a fluid manifold having a turnable section fixedly secured to and rotatable with the arm-carrying structure and a stationary section cooperatively providing a hot fluid supply portion and a return fluid portion; a pipe connection leading from the hot fluid supply portion of the manifold to a receiving end of the heating elements; a pipe connection leading from a discharge end of the heating elements to the return fluid portion of the manifold; a hot-fluid supply pipe extending from the lower portion of the digester upwardly into the arm-carrying structure to a part of the stationary section of the manifold that has direct association with hot fluid supply portion of the manifold; and a cool-fluid return pipe leading from a part of the stationary section of the manifold that has direct association with the return fluid portion of the manifold and extending downwardly within and thence below the arm-carrying structure thence ultimately outward from the lower portion of and with respect to the tank.

10. In a digester construction a tank having a bottom and an upstanding marginal wall, means for feeding sludge thereto, a sediment discharge leading from the lower portion thereof; a horizontally turnable mechanism comprising an arm-carrying structure extending from the exterior of the tank downwardly into the tank and supported in respect to the tank so as to have turning movement about a vertically-extending axis, a sediment raking arm construction, and a scum breaking arm construction which arm constructions are carried from the arm-carrying structure disposed in vertically spaced relationship to each other; a top member encircling said arm-carrying structure for completing a gas space at the upper portion of the tank, provided with sealing means for preventing the escape of gas through the space between the top member on the one hand and the horizontally turnable arm-carrying structure on the other hand; means for imparting turning movement to said arm-carrying structure; tubular heating means having heating coils for providing horizontally spaced heating elements extending vertically from one arm to the other; means for supplying heating fluid to said heating means; and means for withdrawing from said heating means the fluid which has served as a heat supply medium.

11. In a digester as defined in and by claim 10, a manifold having a stationary section and a turnable section cooperatively providing a hot-fluid receiving portion and a return fluid receiving portion, a hot fluid supply pipe leading from the exterior of the digester upwardly through the space within the rotatable arm-carrying structure and terminating in a stationary section of the manifold providing a passageway leading to the hot fluid receiving portion of the manifold, a fluid return pipe leading from the manifold thence downwardly through the rotatable arm-carrying structure and ultimately to the exterior of the digester having a section connected to the stationary section of the manifold and thereby in direct connection with the return fluid receiving portion of the manifold, the turnable section of the manifold being movable with the arm-carrying structure and having a connecting pipe leading from the hot fluid receiving portion of the manifold to the receiving end of the tubular heating means, and a connecting pipe leading from the heating means to the return fluid receiving portion of the manifold.

HENRY J. TALBOT.